United States Patent [19]

Haffer et al.

[11] Patent Number: 4,931,341
[45] Date of Patent: Jun. 5, 1990

[54] ELASTIC SUCTION PLATES FOR DELICATE OBJECTS

[75] Inventors: Dieter Haffer, Vallendar; Hermann J. Jost, Kamp-Bornhofen, both of Fed. Rep. of Germany

[73] Assignee: Masa Maschinenfabrik Olga Kossmann, Andernach, Fed. Rep. of Germany

[21] Appl. No.: 298,134

[22] Filed: Jan. 18, 1989

[30] Foreign Application Priority Data

Jan. 21, 1988 [DE] Fed. Rep. of Germany ....... 3801666

[51] Int. Cl.⁵ ............................ B32B 3/02; B32B 3/10
[52] U.S. Cl. ...................................... 428/81; 428/136; 428/137; 294/64.1; 414/627; 209/905
[58] Field of Search ......................... 428/81, 136, 137; 294/64.1, 65; 414/627; 209/905

[56] References Cited

U.S. PATENT DOCUMENTS 2,853,333  9/1958  Littell .................................. 294/64.1

FOREIGN PATENT DOCUMENTS 2629160  1/1978  Fed. Rep. of Germany ..... 294/64.1

Primary Examiner—Alexander S. Thomas
Attorney, Agent, or Firm—Finnegan, Henderson, Farabow, Garrett and Dunner

[57] ABSTRACT

Elastically deformable suction plates are provided for lifting and transporting delicate goods such as "fresh" concrete interlocking paving stones. In said suction plates, the total suction space is divided into numerous separate suction chambers which are totally enclosed. The design of such a suction plate and the vulcanization mould needed for its production are described.

13 Claims, 4 Drawing Sheets

ELASTIC SUCTION PLATES FOR DELICATE OBJECTS

BACKGROUND OF THE INVENTION

The present invention relates to elastic suction plates for vacuum systems. Suction cups, respectively suction plates, made of elastically deformable material, connected to the low-pressure system by means of rigid, mostly metal parts, are suitable for lifting and transporting compact objects with an essentially even surface. When such a suction plate comes into contact with the object to be lifted and a low pressure is produced in the hollow space therebetween, major forces can be transmitted. With this method, it is in particular possible to lift relatively heavy objects easily for transporting them to the desired place and to deposit them by releasing the low pressure.

In the case of objects which are not delicate, no particular problems occur. It is only required that the suction plate is provided with a flexible lip along its outer edge, resulting in a tight seal between the suction plate and the object to be lifted.

There are difficulties however when delicate objects, in particular those with a not very resistant surface, need to be lifted by means of low-pressure suction plates. It is for instance desirable to handle "fresh" concrete interlocking paving stones immediately after their manufacture, although sufficient strength for doing so would be reached only after several days. Suction plates known for such applications are often not satisfactory. Problems occur particularly with interlocking paving stones with "face mix concrete", i.e. stones having relatively thin, mostly fine-grained upper surfaces, which are often not homogenously connected with the "core concrete" covered by said "face mix concrete" layer.

All these difficulties are overcome with the suction plate according to the present invention which is described below with regard to FIGS. 3-9.

DESCRIPTION OF THE PREFERRED EMBODIMENTS

Figure 1:
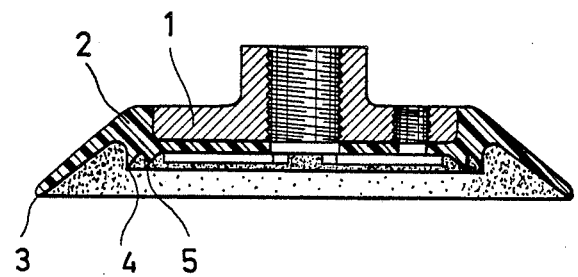
FIG. 1 is a cross-sectional side view showing a conventional suction cup comprising three sealing lips being concentrically arranged, said sealing lips having varying diameters and a moulded-on metal part.

FIG. 1 shows a suction cup according to Swedish utility model No. 80-0078 consisting of a metal low-pressure connection piece 1 and an elastomer body 2 moulded on or hermetically fixed in another way. Body 2 is provided with three circular sealing lips 3, 4 and 5. Thus a seal is obtained with a higher degree of security. Furthermore, the two lips 4 and 5, having smaller diameters, are more suitable for sealing arched surfaces.

Figure 2:
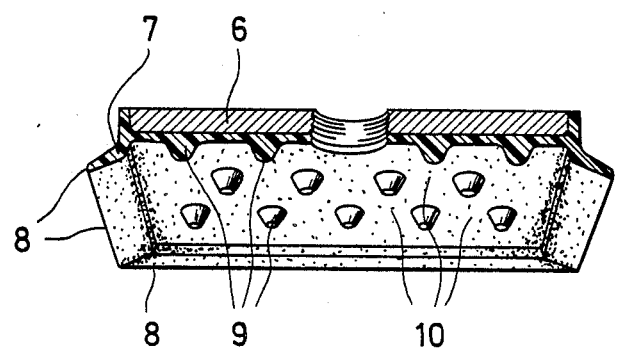
FIG. 2 is a cross-sectional side view showing another conventional suction plate having only one continuous sealing lip, numerous naps and a moulded-on metal plate.

FIG. 2 shows a known suction plate for concrete interlocking paving stones also comprising a metal part 6 and an elastomer body 7 being connected hermetically to the metal part. Usually, the elastomer body is moulded on. The sealing lip 8 is adapted to the outer contour of the stones, and consequently its dimensions are overall somewhat smaller than those of the even stone surface. The suction plate, with its sealing lip 8 and additional numerous rubber naps 9, engage with the stone surface. The rubber naps thus provide support at many points. On one hand, it is intended to have the largest possible hollow spaces 10 between, because the low pressure only acts on these and, on the other hand, the distances between the naps 9 should be relatively small as otherwise damage to the surface of the "fresh" stones is likely. Such damage could be, for example, tearing out of small concrete parts, particularly in the area of the low-pressure connection points; the formation of bubbles between or under the naps; or indentations due to lateral dislocation of the sealing lip 8 during the suction process. Furthermore, a leakage could so reduce the pressure required for lifting the stones that, not only one stone, but a complete layer of stones cannot be lifted. This results in not only damage to a complete layer of goods but also a vital disruption to the whole operation.

The suction plate according to the invention solves all of these problems with the following advantageous features:

division of the suction space into numerous chambers, each of them forming an individually sealed suction space;

at least one junction from each chamber to the suction connection or to a main channel between several connection points which is appropriate with a view to the pressure, respectively flow compensation;

branching of the air connections such that their cross-sections are approximately adapted to the number of suction chambers or connections and that on the largest possible part of the length, there is an individual connecting channel for each suction chamber;

at least one but preferably several important directional changes of these connecting channels;

preferably rectangular cross-sections of these connecting channels with a distinct difference between width and height;

sealing lip of great elasticity, extending vertically to the stone surface, with the lip foot of such a solid formation that the lip does not move laterally on the stone surface during the sealing process;

an all around groove adjacent to the actual sealing lip, said groove having no suction connection;

an all around suction space arranged within the lip foot, thus following approximately the outer contour which is advantageously divided into several suction chambers of which each one has at least one connecting channel to the low-pressure source;

division of the remaining interior space into several, preferably elongated suction chambers, each one having at least one connecting channel to the low-pressure source;

elongated suction chambers, being preferably not wider than 20 mm and having a side angle of approximately 45°.

said suction chamber being separated by uninterrupted webs having a contact area for engaging the stone surface of preferably 1-4 mm.

The following is attained by the features described above:

there is a multistage sealing effect;

at no point of the surface is a detrimental air current generated;

the occurrence of detrimental air currents is suppressed by the abrupt directional changes of the connecting channels;

the risk of tearing off sand grains of the freshly manufactured stones is substantially reduced;

at the points of a change in direction in the connecting channels, further transportation of foreign particles, if any, is hindered;

a total clogging by mostly rounded particles which are occasionally carried along the connecting channels is rendered more difficult, because these channels have a rectangular cross-section;

the suction chambers themselves have sides with an angle of distinctly less than 90° relative to the stone surface thereby rendering unwanted deposits and obstructions more difficult and facilitating cleaning;

a support of the suction plate on the whole relatively large contact area of the webs provided between the individual suction chambers takes place, thereby reducing the specific surface strain of the fresh stones;

there is still a large area of suction space left;

stones with a delicate surface can have suction gently applied to them;

a tight seal can be effected even on rough or porous surfaces;

should local leakage occur, the pressure difference in the total suction space is not reduced to a great extent;

even with local leakage, low pressure sufficient to lift the engaged stones and also the whole layer of stones is maintained in most of the chambers.

The aforementioned, directional changes of the air currents passing through the channels, as well as the the shape of all the suction chambers and other areas, is obtained solely by the design of the vulcanisation moulds, in particular by the choice of a suitable separating level between the upper and lower mould halves and the simplest possible operational processes which obviate any subsequent working on the elastomer body after vulcanisation. By providing an undercut area on this body, it is moreover possible to utilise a pure moulded rubber part as a proper cup. To attach such a suction cup to a suction plate, the required low-pressure connection piece, made of metal or a synthetic material, can be added subsequently without fixed connection with the suction cup. The seal is effected without any further special measures by fastening the rigid connection piece to the low-pressure system. An additional seal results automatically when the desired low pressure is reached. All the above considerably contribute to the fact that the suction plate according to the invention and its method of production is, despite the very special moulding, reasonably priced.

Figure 3:
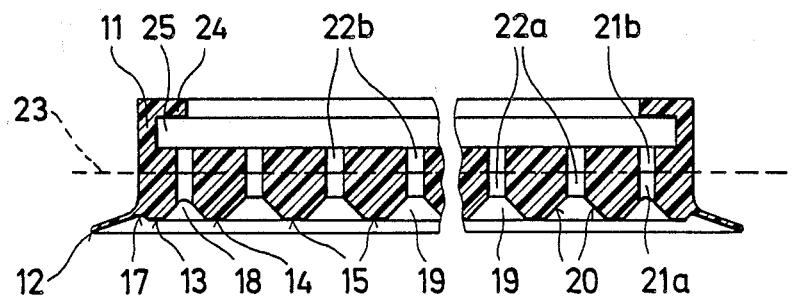
FIG. 3 is a cross-sectional side view showing the elastomer body of the suction plate.
Figure 7:
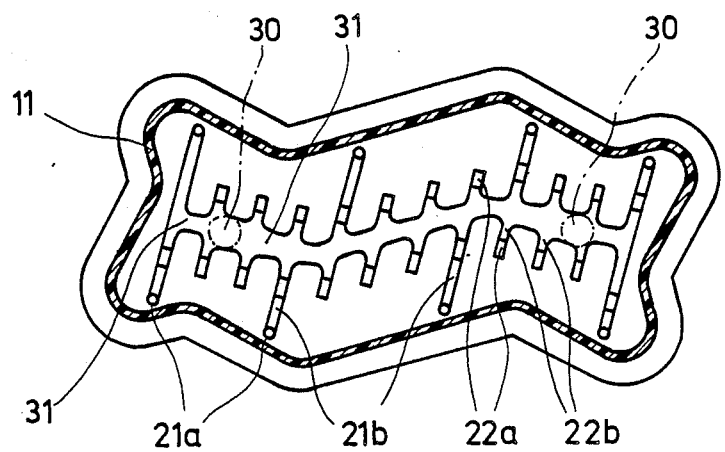
FIG. 7 is a plan view of the embodiment shown in FIG. 5 (the connection piece being omitted).
Figure 9:
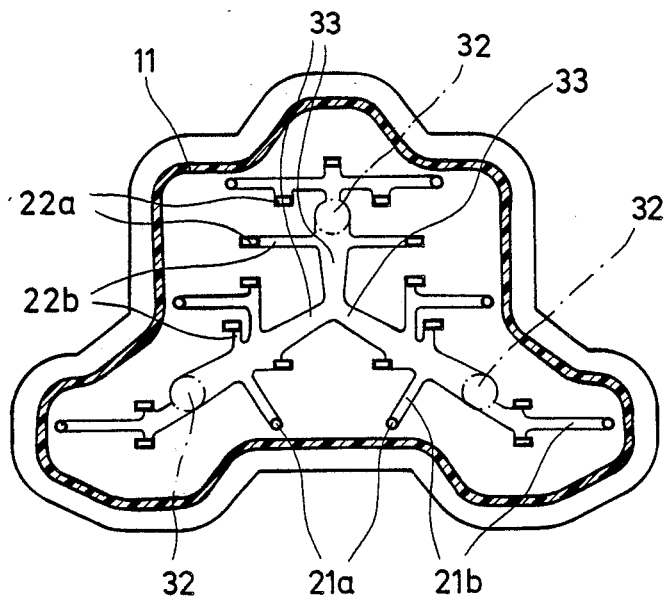
FIG. 9 is a plan view of the embodiment shown in FIG. 8 (the connection piece being omitted).

Explanations of FIGS. 3-9 are given below:

The cross-section through the elastomer body 11 of the inventive suction plate shown in FIG. 3 includes in particular: a sealing lip 12 running round the outer contour of said body; an outer web 13; an interior ring web 14, as well as numerous other longitudinal webs 15 and cross webs 16. Thus, an outer ring channel 17 having no connection with a low-pressure source, an interior ring channel 18, preferably divided by cross webs 16 and connected to a low pressure source, and numerous elongated suction chambers 19 are formed. These channels have, like the ring channel 18, not too steeply sloping sides 20 with, for instance, an angle of inclination of 45° relative to the stone surface. Proceeding from the ring channel 18 and the suction chamber 19, the connecting channels 21, 22 run at first in a vertical direction (21a, 22a) but run above the mould separating level 23 in a horizontal direction (21b, 22b, v. FIGS. 7 and 9). Consequently, each connecting channel changes its direction by 90°. In the upper part of the elastomer body 11, an undercut area 25 is formed by a relatively thick, peripheral elastic lip 24.

Figure 4:
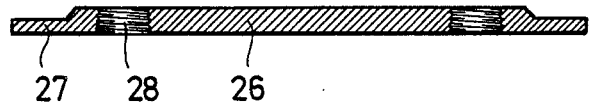
FIG. 4 shows a cross-sectional view through a rigid low-pressure connection piece.
Figure 5:
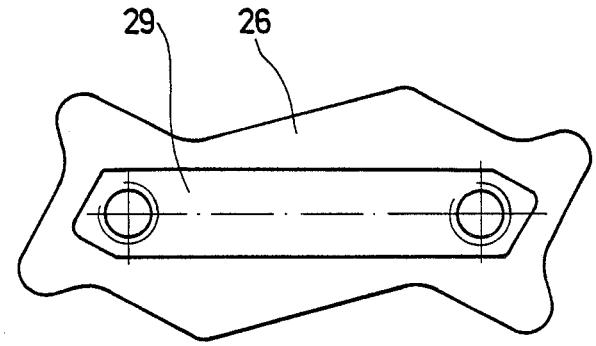
FIG. 5 is a plan view showing the connection piece of FIG. 4.

As shown in FIGS. 4 and 5, the rigid low pressure connection piece 26 with its border area 27 can later on be "buttoned in" to said area 25. If this connection piece is attached to a low-pressure system (not shown here) by, for example, screwing by means of the two threaded connections 28, a seal against that system is simultaneously created by the areas 24 and 27. A rigid, ledge-like projection 29 provided on the connection piece 26 acts as a guide as well as a limit against too strong compression of the elastic lip 24.

Figure 6:
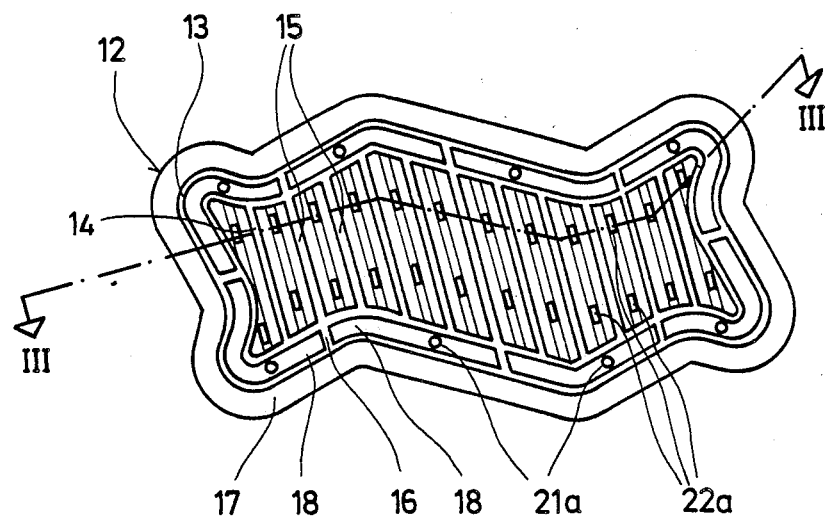
FIG. 6 shows a first embodiment of a suction plate, seen from below.

FIG. 6 illustrates a first embodiment of the suction plate according to the invention, seen from below. FIG. 7 shows said suction plate from the top. The lip 24 has been omitted from FIG. 7 and therefore this figure is a sectional view through the elastomer body 11 taken at the level of the undercut 25. This embodiment includes two low-pressure connection points 30, which are connected with each other by a main channel 31. All connecting channel portions running horizontally as 21b, 22b reach so far that a connection with all vertically extending channel portions 21a, 22a, is obtained (v. FIG. 3) All of the horizontally extending connecting channel portions 21b, 22b branch off from the main channel 31 which not only connects the connecting points 30 but also extends beyond these connecting points 30. It should be noted that there is no vertical channel portion 21, 22a directly opening into the main channel 31. All the channels are produced during the vulcanisation of the elastomer body 11. For the forming of the horizontal channel sections 21b, 22b, one half of the mould is provided with ledge-like projections. For forming the vertical sections 21a, 21b, the other half of the mould is provided with pin-type projections which come together at the mould separating level 23. If possible, a rectangular cross-section of some of the channels has to be provided, as far as this can be obtained from the moulding technological point of view with moderate expenditure. As to further reference numerals, they are not explained again here; please refer to the description of FIG. 3.

Figure 8:
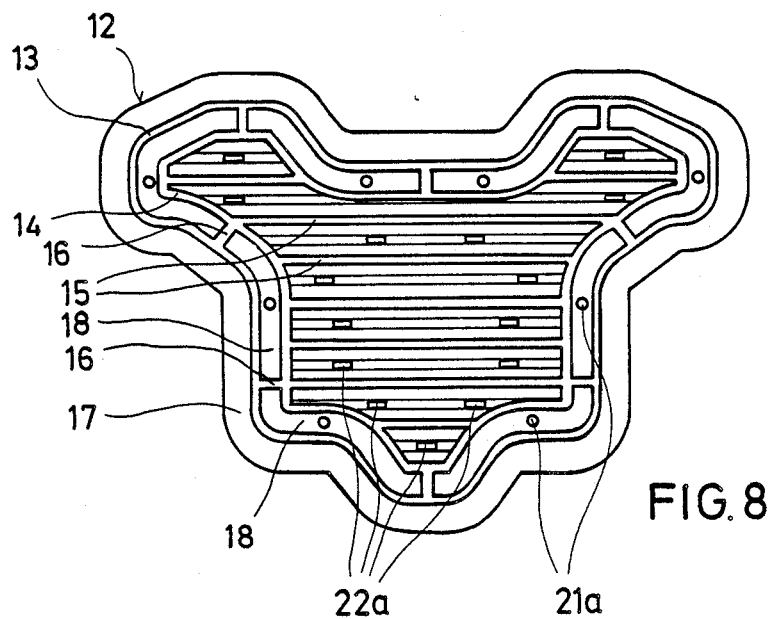
FIG. 8 shows another embodiment of the suction plate, seen from below.

FIGS. 8 and 9 show another embodiment of the invention, also seen from below (FIG. 8) and above (FIG. 9). In FIG. 9, the upper lip 24 has again been omitted for ease of demonstration so that FIG. 9 is a sectional view through the elastomer body 11 at the level of the undercut 25. This embodiment has three low-pressure connection pieces 32, connected by a star-shaped main channel 33. All explanations relating to FIGS. 6 and 7 as well as to FIG. 3 are applicable in the same way to the embodiment of FIGS. 8 and 9. In this case too, it is recognised that each of the elongated suction chambers 19 mostly has two vertical connecting channel portions 22a of the connection channels 22. Only some distinctly shorter suction chambers 19 have only one vertical connecting channel portion 22a. Furthermore, each of the eight illustrated sections of the ring channel 18 have one vertical connection 21a each. These sections are formed by cross webs 16 provided in the ring channel 18. In FIG. 9 it can be clearly seen that a largely different course of the connecting channels 21b, 22b and, apart from the 90° turn in the area of the mould separating level 23, another change in direction, i.e. between channel sections 21a, 22a and channel sections 21b, 22b has been realised.

By the design of the inventive suction plate, and by the vulcanisation mould required for the production of this plate, many advantageous properties can be obtained at relatively low cost. In case of wear or damage, only the elastomer body 11 has to be replaced whereas further considerably more expensive rubber and metal parts need not be replaced.

We claim:

1. A low-pressure suction plate made of elastically deformable material and suitable for lifting and transporting concrete interlocking paving stones immediately after their manufacture, which suction plate comprises an elastomer body member for connection to a rigid low pressure connecting means, such body member comprising a continuous sealing lip extending around the outer contour of said body member and enclosing a total suction space which is divided into a plurality of elongated suction chambers each having a continuous seal therearound and forming an individually sealed suction space when said suction plate is placed on a surface of an object to be lifted, each of said suction chambers being in flow communication with said low-pressure connection means through at least one connecting channel, said channel having at least one change in the direction along its length.

2. The suction plate of claim 1, wherein said low pressure connecting means comprises a plurality of low-pressure connections each in flow communication with the other by a main connecting channel in said body member.

3. The suction plate of claim 2, wherein at least one of the low-pressure connections, or the main channel, is connected to a plurality of connecting channels, the size of each cross-section of each connection channel being determined by the number of connecting channels in flow communication with said low-pressure connection or main channel.

4. The suction plate of claim 3, wherein each connecting channel exceeds to as great a distance as possible from the other connecting channels.

5. The suction plate of claim 3, wherein all of said connecting channels have rectangular cross-sections and have differing widths and heights.

6. The suction plate of claim 1, wherein within the continuous sealing lip extending around the edge of the suction plate there is provided a continuous first web, also extending around said edge and which is arranged at a constant distance from said sealing lip, both the lip and the web approximately corresponding to the outer contour of the object to be lifted, the space between said web and said lip forming a ring channel which is not in flow communication with said low pressure connection means.

7. The suction plate of claim 6, wherein within the first web extending around said outer contour a second continuous web is arranged at a constant distance from the first web to produce a second ring channel therebetween, said second ring channel being divided by means of a plurality of cross webs into a plurality of suction chambers of which each one has at least one connecting channel connected to a low-pressure connection.

8. The suction plate of claim 7, wherein the area within the second web is divided by third webs into a plurality of elongated suction chambers arranged parallel to each other, each chamber of which has at least one connection channel connected to a low-pressure connection.

9. The suction plate of claim 8, wherein each of the plurality of suction chambers is defined by webs adapted to contact the object to be lifted.

10. The suction plate of claim 9, wherein the width of each suction chamber is smaller than its length and is less than 20 mm.

11. The suction plate of claim 10 wherein the suction chambers have sloping sides, the angles of which, relative to the surface of the object to be lifted, are smaller than 90°.

12. The suction plate of claim 11, wherein the elastomer body is provided with an undercut in its upper part for connecting said body member to said rigid low-pressure means the sealing of said suction plate of the object to be lifted being effected without further measures merely by fastening said rigid connecting means to a low-pressure source and by the low pressure created by said low-pressure source.

13. The suction plate of claim 8, wherein the elastomer body has been manufactured using a two-part vulcanization mold, the separation level of the lower part thereof runs within the elastomer body between the bottom level of the horizontally extending connecting channel and the opening of vertically extending channels into the suction chambers and in one of the two mold portions, the channels are formed parallel to said mold separation level, and wherein in the lower portion, the channels are formed vertically to said level such that all of said channels change their direction along their length, all of said channels having being formed during vulcanization.

* * * * *